Aug. 21, 1962 T. J. TUTEN 3,049,885
MASTER HYDRAULIC BRAKE CYLINDER
Filed May 19, 1960 3 Sheets-Sheet 1

INVENTOR.
Thomas J. Tuten.
BY
George H. Baldwin
ATTORNEY

Aug. 21, 1962 — T. J. TUTEN — 3,049,885
MASTER HYDRAULIC BRAKE CYLINDER
Filed May 19, 1960 — 3 Sheets-Sheet 2
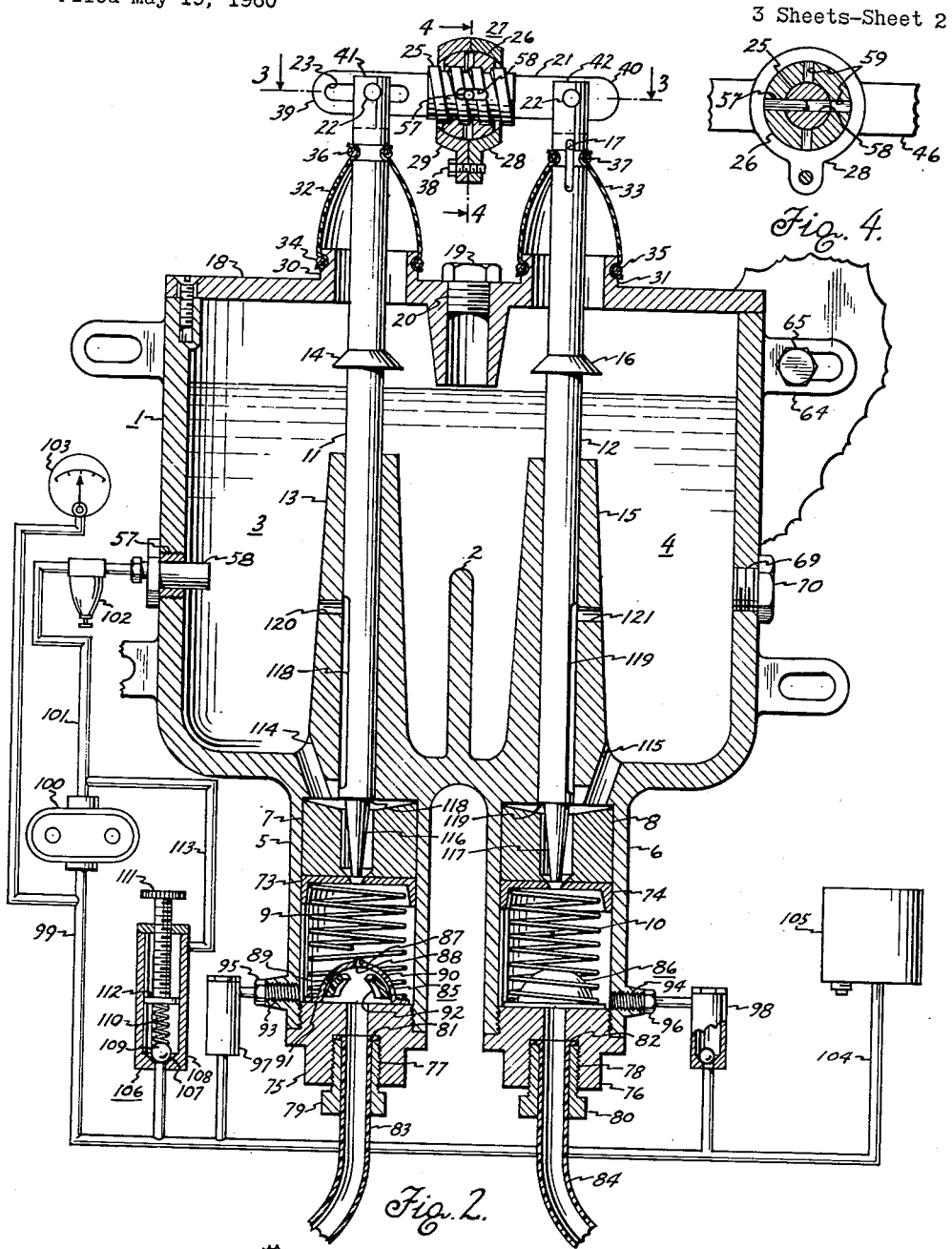
Fig. 2.
Fig. 4.
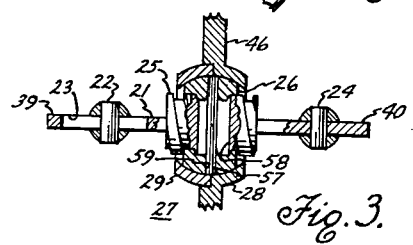
Fig. 3.
INVENTOR.
Thomas J. Tuten.
BY
George H. Baldwin
ATTORNEY Aug. 21, 1962

T. J. TUTEN 3,049,885

MASTER HYDRAULIC BRAKE CYLINDER

Filed May 19, 1960

INVENTOR.
Thomas J. Tuten
BY
George N. Baldwin
ATTORNEY

United States Patent Office 3,049,885
Patented Aug. 21, 1962

3,049,885
MASTER HYDRAULIC BRAKE CYLINDER
Thomas J. Tuten, Rte. 1, Box 272, Live Oak, Fla.
Filed May 19, 1960, Ser. No. 30,354
10 Claims. (Cl. 60—54.6)

This invention relates to brake systems for motor vehicles.

A general object of this invention is to provide an improved master cylinder assembly for operating a plurality of brake mechanisms of vehicles.

Conventional master cylinders of brake systems of motor vehicles are horizontally positioned and the piston plungers slide through packing glands. Such glands are subject to leakage which results in loss of brake fluid and a loss of brake pressure.

Accordingly, a further general object of the present invention is to eliminate packing glands and fluid leakage therefrom in a master cylinder assembly.

Another and different object of this invention is to provide a dual master cylinder assembly in which the pressure of the fluid in the front wheel brake mechanisms can be adjusted with respect to the pressure of the fluid in the rear wheel brake mechanisms.

A specific object of this invention is to provide a master cylinder assembly wherein the fluid within the master cylinder is periodically filtered.

An additional specific object of this invention is to provide an improved master cylinder assembly wherein a loss of fluid in the front wheel brake mechanisms resulting in a loss of front wheel brakes will not cause a loss of the rear wheel brakes or vice versa.

Another specific object of this invention is to provide an improved manual master cylinder assembly in which the brakes may be effectively pumped in order that the fluid pressure on the brake mechanisms may be increased.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 2 is a transverse sectional view of the assembly of FIG. 1 taken along line 2—2 of FIG. 1 but with the parts in the positions assumed when the brakes are not being applied and including a partly diagrammatic representation of the power brake system;

FIG. 3 is a transverse sectional view partly broken away taken along line 3—3 of FIG. 2;

FIG. 4 is a transverse sectional view taken along line 4—4 of FIG. 3;

Figure 1:
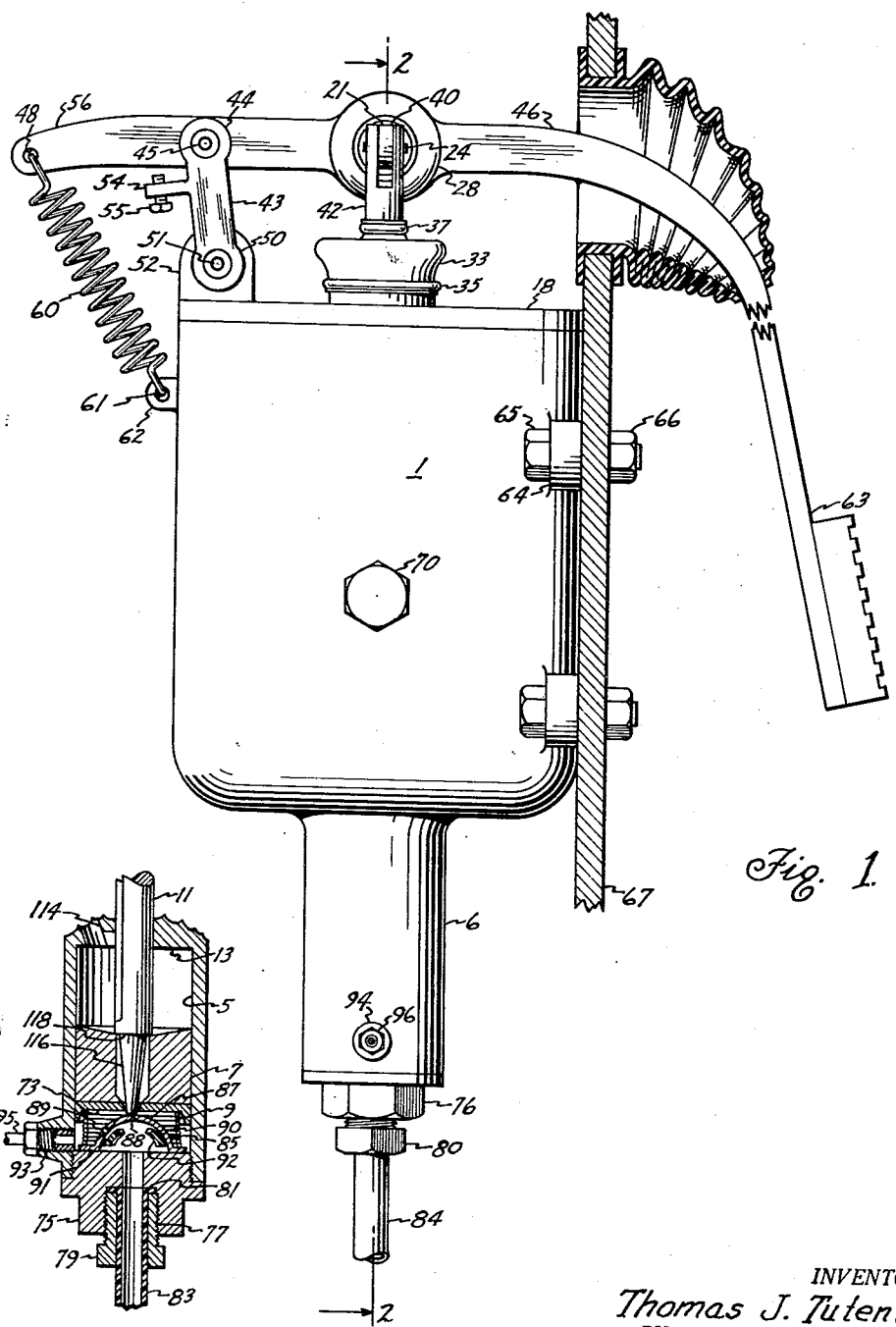
FIG. 1 is a side elevational view illustrating the improved power master brake cylinder assembly with the parts in the positions assumed when the brakes are being applied, certain portions being shown in section for clarity.

This invention is directed in one aspect to an upright dual power master brake cylinder assembly for operating a plurality of brake mechanisms having a hydraulic fluid reservoir divided by a partition into two sections with a pair of piston holding cylinders, one respectively connected to the lower extremity of each of the sections with a passageway between the sections and cylinders. Guide sleeves are positioned within said sections over each of the cylinders and have plungers slidably mounted within the sleeves for forcing the pistons downward in the cylinders. The pistons are provided with valve apertures and the plungers are provided with valve means which close the apertures of the pistons when the plungers are forced into operating engagement with the pistons. Piston returning springs are positioned between each of the pistons and the lower end of the cylinders for urging the pistons to the upper end of the cylinder when the plungers are withdrawn. The foot brake lever is pivotally mounted on the casing and holds an adjustable rocker arm which is connected to the plungers. Between the foot brake lever and casing there is provided a spring which causes the foot brake lever to assume the rest position and the plungers to be withdrawn in a direction to release the brakes. Adjustment of the rocker arm causes the pressure, when the brakes are applied, of the fluid against the pistons or the pressure in the brake carrying tubes to be varied in accordance with the adjustment made.

This invention also contemplates a manual system which comprises an upright dual manual master cylinder assembly with parts interchangeable with the parts herein described of the power system for operating a plurality of brake mechanisms.

Referring now more particularly to the drawings of FIGS. 1 to 4, wherein like reference characters denote corresponding parts, the improved upright dual master cylinder of thisc invention includes a reservoir 1 with the lower portion of the reservoir 1 being divided by a partition 2 into sections 3 and 4. Cylinders 5 and 6 extend downwardly from the respective sections 3 and 4 with pistons 7 and 8 positioned within the respective cylinders 5 and 6 and the pistons 7 and 8 being respectively urged upwardly by springs 9 and 10. Plungers 11 and 12 are connected by a rocker arm 21 at the respective upper end portions 41 and 42 with the lower tapering end portions 116 and 117 of the plungers 11 and 12 being respectively inserted within pistons 7 and 8.

The section 3 of the reservoir 1 is provided with an elongated sleeve 13 in which the plunger 11 is slidably mounted; the plunger 11 being provided with a collar 14 which functions as a stop for the plunger 11 when the collar 14 engages the upper end of sleeve 13. The section 4 of the reservoir 1 is likewise provided with an elongated sleeve 15 having a collar 16 which functions in the same manner as collar 14.

The upper end portion 41 of plunger 11 is connected by a pin 22 which engages in or extends through an elongated arcuate slot 23 in end portion 39 of the rocker arm 21 and the opposite end portion 40 of rocker arm 21 is connected by a pin 24 to the upper end portion 42 of plunger 12. The plunger 12 is provided with a ventilating groove 17 indented at the upper end portion 42 of the plunger 12 to prevent air pressure build-up in the upper part of the reservoir 1. The upper portion of the reservoir 1 is covered by top 18 with a hydraulic fluid filling plug 19 being threaded in a boss 20. The top 18 is also provided with bosses 30 and 31 to which the lower portions of the respective rubber boots 32 and 33 are attached by wire rings 34 and 35 therearound. The upper portions of the rubber boots 32 and 33 are attached by wire rings 36 and 37 therearound to the upper portion of the respective plungers 11 nad 12.

The rocker arm 21 is provided with a section 25 that is threaded with a ball 26 positioned within a ball socket 27 formed by a portion 28 of lever arm 46 and a removable section 29 with section 29 secured to portion 28 by a threaded bolt 38. The rocker arm 21 is provided with flat portions 39 and 40 respectively connected to plungers 11 and 12 by the respective pins 22 and 23. By using the threaded rocker arm 21 with an arcuate slot 23 therein, the amount of force applied to plunger 11 is made adjustable so that the resultant hydraulic pressure in cylinder 5, after the force is applied, may be adjusted with respect to the pressure in cylinder 6. In the specific construction herein illustrated the threaded rocker arm 21 with the arcuate slot 23 allows plunger 11 to be raised ¼ inch higher or ¼ inch lower than plunger 12 when a force is applied to the foot pedal portion 63 of lever 46, thus allowing for sufficient adjustment of the hydraulic pressures in the respective cylinders 5 and 6.

The relative forces, applied to plungers 11 and 12 when the foot pedal portion 63 of lever 46 is forced downwardly, are adjusted by first removing section 29 by withdrawing bolt 38. Then, if necessary the portion 28 of lever arm 46 is slightly moved away from ball 26, the locking pin 57 is pushed out of slot 58 in the threaded portion 25 of rocker arm 21 and out of aperture 59 extending through ball 26. The ball 26 is then free to be turned on the threaded portion 25 of rocker arm 21 to the adjusted position either closer to plunger 11 which would result in a greater pressure exerted thereon when the plungers 11 and 12 are forced downwardly or away from plunger 11 which would result in a lesser pressure. With the ball 26 in the adjusted position and one of the apertures 59 in ball 26 being in alignment with slot 58 in the threaded portion 25 of rocker arm 21, the locking pin 57 is inserted into the aligned aperture 59 and slot 58. The ball 26 is thus made secure with the threaded portion 25 of rocker arm 21. The removable section 29 and portion 28 of lever arm 46 are then secured to each other by bolt 38 which results in the socket 27 for the ball 26.

If the ball 26 is equally spaced between plungers 11 and 12, equal pressure will be exerted thereon, but when the front wheel mechanisms require less pressure than the rear wheel mechanisms, or vice versa, the adjustable rocker arm 21 will allow for an adjustment of such unequal pressures.

The rocker arm 21 is positioned between bifurcated upper ends 41 and 42 of the respective plungers 11 and 12 with the portion 28 of the socket 27 being part of the foot brake lever 46. The foot brake lever 46 is thus connected to the rocker arm by portion 28 forming part of the ball socket 27. The lever 46 is mounted on the top 18 of reservoir 1 by link 43 having a bifurcated end portion 44 attached by pin 45 to the foot brake lever 46 and the link 43 has a bifurcated end 50 attached by a pin 51 to an ear 52 extending from top 18. The link 43 is provided with an outwardly extending portion 54 having a set screw 55 therein which provides an adjustable means for limiting the downward movement of the rear end 56 of the lever 46. The rear end 56 of the lever is provided with an opening 48 in which an end portion of a spring 60 is inserted and the other end of spring 60 is secured in an opening 61 in ear 62 from reservoir 1. The spring 60 urges the rear end of lever 46 downwardly and retains the pedal portion 63 of the lever 46 in an outwardly extended position.

The reservoir 1 is mounted on the front wall 67 of the cab of a vehicle (not shown) by means such as a lug 64 on the reservoir 1 with a bolt 65 therethrough and a nut 66 on bolt 65 securing the reservoir 1 to the front wall 67. On the right side of reservoir 1 there is provided an opening 69 with a threaded stud 70 within the opening 69 which allows for partial drainage of the hydraulic fluid from the reservoir 1. On the left side of reservoir 1 there is provided an opening 57 with a threaded hollow pipe fitting 58 within the opening 57 which allows the hydraulic fluid to be recirculated and will be described in a later part of this specification.

The pistons 7 and 8 are provided with cup washers 73 and 74 which rest on the upper ends of the springs 9 and 10 and the lower ends of the cylinders 5 and 6 are provided with plugs 75 and 76. The plugs 75 and 76 are provided with openings 77 and 78 with threaded coupling plugs 79 and 80 therein which firmly hold the flanges 81 and 82 of tubes 83 and 84. Mounted on plugs 75 and 76 within the cylinders 5 and 6 are two-way check or leaky flap valves 85 and 86. The leaky flap valve will be described with reference to valve 85 and includes a bowl member 87 provided with three apertures; a center aperture 88 which allows the fluid in the tube 83 to return to the cylinder 5 when the piston 7 is in the upper part of cylinder 5; and side apertures 89 and 90 with flaps 91 and 92 which only allow the fluid to pass through the side apertures 89 and 90 when the plunger 11 is in its downward position as shown in FIG. 5.

One the side of the cylinders 5 and 6 within openings 93 and 94 there are mounted threaded fittings 95 and 96 for connection to check valves 97 and 98 with the check valves 97 and 98 being connected to the output 99 of hydraulic pump 100 with the intake 101 of pump 100 being connected through a filter 102 to the pipe fitting 58 (referred to previously) which is threaded within opening 57 in the side of reservoir 1. There is also connected to the output 99 of pump 100 a pressure meter 103 and at the lower end 104 of the output 99 there is connected an accumulator 105. Connected between the output 99 and input 101 of pump 100 is a pressure regulator 106 which includes opening 107 within the body 108 closed by a ball 109 which is urged by spring 110 into engagement with the opening 107. The compression of the spring is adjusted by the use of set screw 111 mounted through the body 108 with the lower end 112 engaging the spring 110. The lower end 112 is apertured to allow hydraulic fluid to pass through the pressure regulator 106 by flowing into the opening 107 and out tube 113 to the input 101 of pump 100.

Passageways 114 and 115 are provided within the reservoir 1 to allow hydraulic fluid to pass from the sections 3 and 4 respectively through openings 114 and 115 and respectively into cylinders 5 and 6.

Figure 5:
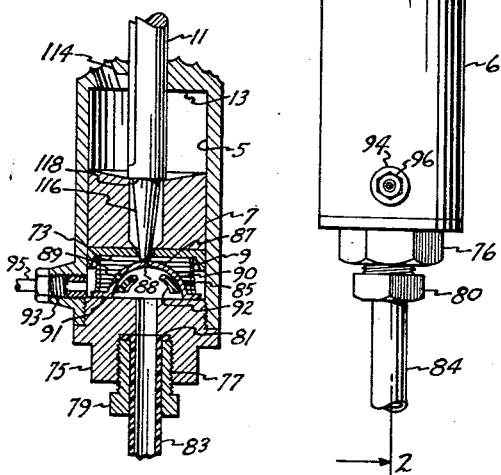
FIG. 5 is a sectional view on the same section as FIG. 2 showing a portion of the master cylinder assembly with parts in positions assumed when the brakes are being applied.

In the specific embodiment illustrated the lower ends of plungers 11 and 12 are provided with tapering pins 116 and 117 which extend from shoulders 118 and 119, respectively, and when the plungers 11 and 12 are forced downwardly the shoulders 118 and 119 engage the upper portions of pistons 7 and 8 to form a valve for the hydraulic fluid, as seen by an inspection of FIGS. 2 and 5. Also, the end portions of pins 116 and 117 form a valve fit with the openings in the cup washers 73 and 74. Furthermore, the end of tapering pin 116 forms a closure for the opening 88 in the flap valve 85, and similarly pin 117 co-acts with the opening (not shown) in flap valve 86 when the plungers 11 and 12 are in the most downward position as shown in FIG. 5. The grooves 118 and 119 in the plungers 11 and 12 and ports 120 and 121 within sleeves 13 and 15 will be specifically referred to in reference to FIG. 6 and serve no useful purpose in the power brake system of FIG. 2, except that the same type plungers 11 and 12 and sleeves 13 and 15 can be used in either system.

The operation of the power brake system of FIG. 2 will first be described when the plungers 11 and 12 and thus foot brake pedal portion 63 of lever 46 are in the upward position. Hydraulic fluid is circulated by pump 100 to the output 99, through the check valves 97 and 98 to a position within the lower portions of cylinders 5 and 7, then through the openings in cup washers 73 and 74 and the apertures in the pistons 7 and 8, then through the passageways 114 and 115 and the pipe fitting 58, then through the filter 102 and finally to the input 101 of pump 100.

The pressure meter merely indicates the pressure of the fluid after the fluid leaves the pump 100 through the output 99 and pressure regulator 106 adjustably allows some of the fluid to be recirculated without all the fluid being passed into the cylinders 5 and 6. Check valves 97 and 98 only allow fluid passage into the cylinders 5 and 6.

When the pedal portion 63 of foot brake lever 46 is urged downwardly, the rocker arm 21 and plungers 11 and 12 are forced downwardly with the shoulders 118 and 119 of plungers 11 and 12 sealing off the apertures in the pistons 7 and 8 and the end portions of tapering pins 116 and 117 sealing the openings in cup washers 73 and 74. The pressure of the fluid from the pump 100 then forces the fluid through the side apertures 89 and 90 of the flap valve 85 and similarly through the side apertures (not shown) in flap valve 86. Some of the fluid is forced through the opening 88, but this opening is closed when the plunger 11 forces the piston 7 to the most downward position as shown in FIG. 5. The pressure of the fluid from the pump 100 with the additional pressure imparted to the fluid in the lower portion of cylinders 5 and 6 due to the plungers 11 and 12 forcing the pistons 7 and 8 downwardly results in the fluid being forced into tubes 83 and 84 which are respectively connected to the front wheel brake mechanisms and the rear wheel brake mechanisms (not shown).

If the pump 100 fails, it is seen that the master brake cylinder assembly will function effectively as a manual type assembly due to the valving arrangement. Furthermore, the valves comprising the lower portions of plungers 11 and 12 which are specifically shown as tapered pins 116 and 117 and the apertures in the pistons 7 and 8 allow for effective air and debris bleeding of the lower portions of the cylinders 5 and 6. Any air and some of the debris will pass through the apertures in the pistons 7 and 8 with the air passing through the vent 17 and the debris being filtered by filter 102.

Figure 6:
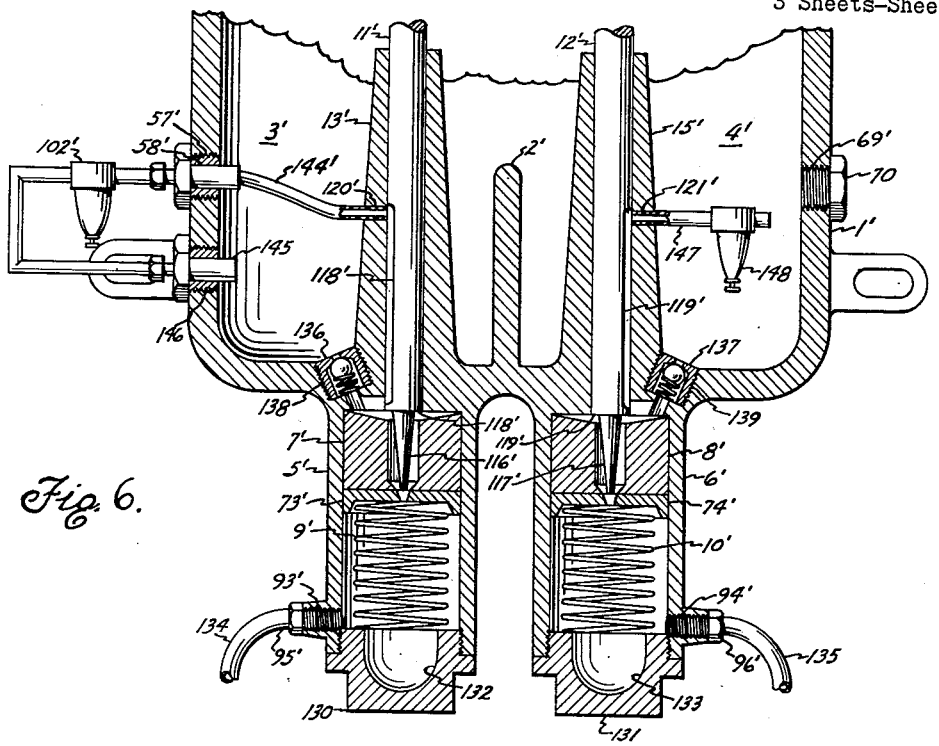
FIG. 6 is a transverse sectional view similar to FIG. 2 which illustrates the improved manual master cylinder assembly.

A manual master cylinder assembly is shown in FIG. 6, of which several parts identified by primed characters may be identical to correspondingly identified parts in FIGS. 1 to 5. These parts, in actual use, may be interchangeable between manual and power systems, thereby reducing the total number of different parts of which a manual or power system could be made.

In the manual master cylinder assembly, the parts interchangeable with a power master cylinder assembly include a reservoir 1', dividing partition 2', sections 3' and 4', sleeves 13' and 14', plungers 11' and 12', cylinders 5' and 6', pistons 7' and 8', springs 9' and 10', pipe fittings 58', 95' and 96', filter 102', tapering pins 116' and 117', and washers 73' and 74' all arranged in the manner heretofore described in connection with FIGS. 1, 2 and 5 for the similarly identified parts.

It will be noted, however, that in FIG. 6, check valves 136 and 137 are interposed between the respective sections 3' and 4' and the cylinders 5' and 6'. These check valves 136 and 137 are used in the manual system of FIG. 6 whereas passageways 114 and 115 are used in the power system of FIG. 2. Wheel cylinder connecting tubes 134 and 135 are connected to the respective lower portions of cylinders 5' and 6' by pipe fittings 95' and 96' threaded through openings 93' and 94'. The cylinders 5' and 6' are provided with plugs 130 and 131 having cup depressions 132 and 133 for retaining some of the debris from flowing into tubes 134 and 135.

The exterior appearance of the manual master cylinder and pedal arrangement is substantially precisely that of FIG. 1 except there is no lower connecting tube 84 or pipe fitting 78 connecting through an apertured plug 76.

Plungers 11' and 12' are provided with grooves 118' and 119' which extend from portions of the plungers 11' and 12' exposed to the respective cylinders 5' and 6', while the plungers 11' and 12' are in the most upward position, to remote portions of the plungers 11' and 12' which are within the sections 3' and 4' respectively and are exposed thereto by ports 120' and 121' through sleeves 13' and 15'. These grooves 118' and 119' allow the fluid to be circulated after the plungers 11' and 12' have been fully withdrawn by a spring like 60 connected to the foot brake lever 46 shown in FIG. 1.

The port 118' is connected by a tube 144 to the fitting 58' threaded within opening 57' of reservoir 1'. Filter 102' is connected between fittings 58' and 145 threaded within openings 57' and 146 in reservoir 1'.

The port 121' is connected by a tube 147 to a filter 148 which allows the fluid to merely drain within section 4' of reservoir 1'. It is evident that filter 148 may be connected between the port 121' and reservoir 1' as shown by the connections of port 120'. It is furthermore evident that filter 102' may be attached to port 120' as shown by the connection of filter 148 to port 121'.

In the operation of the manual brake system of FIG. 6 there is no fluid circulation when the brake pedal portion like 63 as shown in FIG. 1 is in the rest or upward position. When the brake pedal portion 63 of lever 46 is depressed with a resulting depression of the plungers 11' and 12', the ports 120' and 121' are closed. The apertures in pistons 7' and 8' and the openings in cup washers 73' and 74' are closed by the end tapering portions 116' and 117' of the respective plungers 11' and 12'. The fluid in the lower portions of cylinders 5' and 6' is then forced into the respective tubes 134 and 135 to the wheel brake mechanisms (not shown). While the pistons 7' and 8' are being forced downward by the respective plungers, fluid from sections 3' and 4' passes through the respective check valves 136 and 137 into the upper portion of cylinders 5' and 6' above the closed pistons 7' and 8'. When the plungers 11' and 12' are withdrawn, the urging of the pistons 7' and 8' upwardly by springs 9' and 10' forces some of the fluid above the pistons 7' and 8' through the apertures within the pistons 7' and 8'. The fluid is thus mixed with the fluid already below pistons 7' and 8' and remains under pressure until the grooves 118' and 119' engage respective ports 120' and 121'. The fluid under pressure within cylinders 5' and 6' is then forced along the grooves 118' and 119' out the respective ports 120' and 121'. The fluid is then filtered by filters 102' and 148 before the fluid is returned to the respective sections 3' and 4' of reservoir 1. Also, any air within cylinders 5' and 6' likewise passes along the grooves and ultimately escaping out a ventilating groove like 17 shown in FIG. 1.

When the plungers 11' and 12' are only partly withdrawn by a spring like 59 of FIG. 1, the pistons 7' and 8' are urged upwardly by springs 9' and 10' which forces some of the fluid above the pistons 7' and 8' through the apertures thereof. When the plungers 11' and 12' are again forced downward, the cylinders 5' and 6' containing more fluid than before will result in a greater pressure of the fluid that is applied to the wheel brake mechanisms. It is therefore seen that the foot brake pedal like 63 of lever 46 of FIG. 1 can be effectively pumped when desired as long as the grooves 118' and 119' are not adjacent the respective ports 120' and 121'.

While only certain preferred embodiments of this invention have been shown and described by way of illustration, many modifications will occur to those skilled in the art and it is, therefore, desired that it be understood that it is intended in the appended claims to cover all

What is claimed as new and what it is desired to secure by Letters Patent of the United States is:

1. A manual master brake cylinder assembly for operating a plurality of brake mechanisms comprising a hydraulic fluid reservoir having a cylinder at the lower extremity thereof, a piston within said cylinder, said piston having an aperture therein, a hollow sleeve member formed to enclose the upper part of said cylinder, a check valve mounted between said reservoir and the upper end portion of said cylinder above said piston, a plunger passing through said reservoir and extending through said hollow sleeve and into said cylinder, said plunger while in an upward position having a portion exposed to the interior of said cylinder, a groove extending from said exposed portion of said plunger to a remote portion of said plunger which is within said reservoir.

2. A manual dual master brake cylinder assembly for operating a plurality of brake mechanisms comprising a hydraulic fluid reservoir having a pair of cylinders at the lower extremity thereof, a piston respectively within each said cylinders, said piston having an aperture therein, a hollow sleeve member respectively enclosing the upper part of each of said cylinders, a check valve respectively mounted between said reservoir and the respective upper end portion of each of said cylinders above said piston, a pair of plungers respectively passing through said reservoir and extending through said hollow sleeve member and with each extending into said respective cylinders, said plungers while in an upward position having a portion exposed to the interior of said cylinders, a groove extending from said exposed portion of said plungers to a remote portion of said plungers which is within said reservoir.

3. The manual dual master brake cylinder assembly as defined in claim 2 wherein each of said hollow sleeve members is provided with a port extending therethrough to provide a passageway between said remote portion of each said plungers and said reservoir.

4. The manual dual master brake cylinder assembly as defined in claim 3 further comprising at least one means for filtering the hydraulic fluid, said means being connected to at least one of said sleeves at the port extending therethrough.

5. A manual dual master brake cylinder assembly for operating a plurality of brake mechanisms comprising a hydraulic fluid reservoir having a pair of cylinders at the lower extremity thereof, a pair of pistons with one piston respectively within each said cylinders, said pistons having an aperture therein, a hollow sleeve member formed to enclose the upper part of said cylinders, a check valve respectively mounted between said reservoir and the respective upper end portion of said cylinders above said pistons, a pair of plungers respectively passing through said reservoir and with each extending through said hollow sleeve member and into said respective cylinders, a rocker arm connected between said plungers at the upper end portion thereof, said plungers while in an upward position having a portion exposed to the interior of said cylinders, a groove extending from said exposed portion of said plungers to a remote portion of said plungers which is within said reservoir, said rocker arm being adjustable so that the pressure of fluid against the respective pistons upon the application of the brakes may be varied.

6. A manual master brake cylinder assembly for operating a plurality of brake mechanisms comprising a hydraulic fluid reservoir having a cylinder at the lower extremity thereof, a piston within said cylinder, said piston having a valve aperture therein, a hollow sleeve member formed to enclose the upper part of said cylinder, a check valve mounted between said reservoir and the upper end portion of said cylinder above said piston, a plunger passing through said reservoir and extending through said hollow sleeve and into said cylinder, means for moving said plunger in and out, said plunger comprising at the portion thereof which extends within said cylinder valve means engageable with said piston at said aperture for closing said aperture when said plunger is forced into operating engagement with said piston, said plunger while in an upward position having a portion exposed to the interior of said cylinder, a groove extending from said exposed portion of said plunger to a remote portion of said plunger which is within said reservoir.

7. A power dual master brake system comprising a hydraulic fluid reservoir having a pair of cylinders at the lower extremity thereof, a pair of pistons with one piston respectively within each said cylinders, said pistons having a valve aperture therein, a pair of plungers respectively mounted through said reservoir and extending within each said respective cylinders, a rocker arm connected between said plungers at the upper end portions thereof, means for rocking said rocker arm for moving said plungers in and out simultaneously, said plungers comprising at the portion thereof which extends within each said cylinders valve means engageable with said piston at said aperture for closing said aperture when said plungers are forced into operating engagement with said respective pistons, said cylinders having an aperture therein with a two-way check valve respectively enclosing said apertures, a front wheel fluid carrying tube connected to said aperture in one of said cylinders for connection to the front wheel brakes, a rear wheel fluid carrying tube connected to said aperture in the other of said cylinders for connection to the rear wheel brakes, a hydraulic pump connected between said reservoir and each of said cylinders in the space between said piston and said check valve, said rocker arm being adjustable so that the pressure of fluid within each said tube upon the application of the brakes may be varied.

8. An upright dual master brake cylinder assembly for operating a plurality of brake mechanisms comprising a vertically disposed hydraulic fluid reservoir with a center partition dividing the reservoir into sections, a pair of cylinders one respectively connected to the lower extremity of each said sections, guide sleeves positioned within said sections over each said cylinders, vertically disposed plungers slidably mounted within each said sleeves and extending through said reservoir, said plungers having a rubber boot mounted thereon for connection to the top of said reservoir, a piston positioned respectively within each said cylinders and having a valve aperture therein, said plungers co-acting with said pistons to provide valves which close with downward movement of said plungers, a two-way check valve respectively within the lower end of said cylinders, a spring respectively positioned between each said piston and said lower end of said cylinders, a brake fluid carrying tube respectively extending from said lower end of each said cylinders for connection to a plurality of brake mechanisms, a foot brake lever being pivotally mounted on the top of said reservoir for urging said plungers downwardly, a rocker arm connected to said foot brake lever and operatively connected to the upper end portions of said plungers, a spring mounted between said reservoir and said foot brake lever for withdrawing said plungers when the foot brake lever is released, said rocker arm being adjustable so that pressure of fluid within each said tube upon the application of a force on the foot brake lever may be varied.

9. In a dual master cylinder assembly for operating a plurality of brake mechanisms in a vehicle comprising a hydraulic fluid reservoir having a pair of cylinders at the lower extremity thereof, a piston respectively within each said cylinder, a plunger respectively mounted through said reservoir and extending into each said respective cylinder for operating said piston therewithin, each said piston having a respective valve aperture therein, means for moving said plunger in and out, each said plunger including at the end portion thereof which extends within said cylinder valve means engageable with said piston at said aperture for closing said aperture when said plunger is forced into operating engagement with said piston and a rocker arm connected between said plungers at the upper end portions thereof, said rocker arm being adjusted so that the pressure of fluid against each said respective piston upon the application of brakes may be varied.

10. In the dual master cylinder assembly as defined in claim 9 further comprising a check valve respectively mounted between said reservoir and the upper end portion of each said cylinder above each said piston.

References Cited in the file of this patent

UNITED STATES PATENTS

| | | |
|---|---|---|
| 2,004,078 | McDougall | June 4, 1935 |
| 2,020,465 | Hall | Nov. 12, 1935 |
| 2,131,459 | Weatherhead | Sept. 27, 1938 |
| 2,447,142 | Smith et al. | Aug. 17, 1948 |
| 2,526,720 | Bacca | Oct. 24, 1950 |
| 2,661,597 | Edge | Dec. 8, 1953 |
| 2,762,199 | Major | Sept. 11, 1956 |

FOREIGN PATENTS

| | | |
|---|---|---|
| 342,802 | Great Britain | Feb. 12, 1931 |